United States Patent Office.

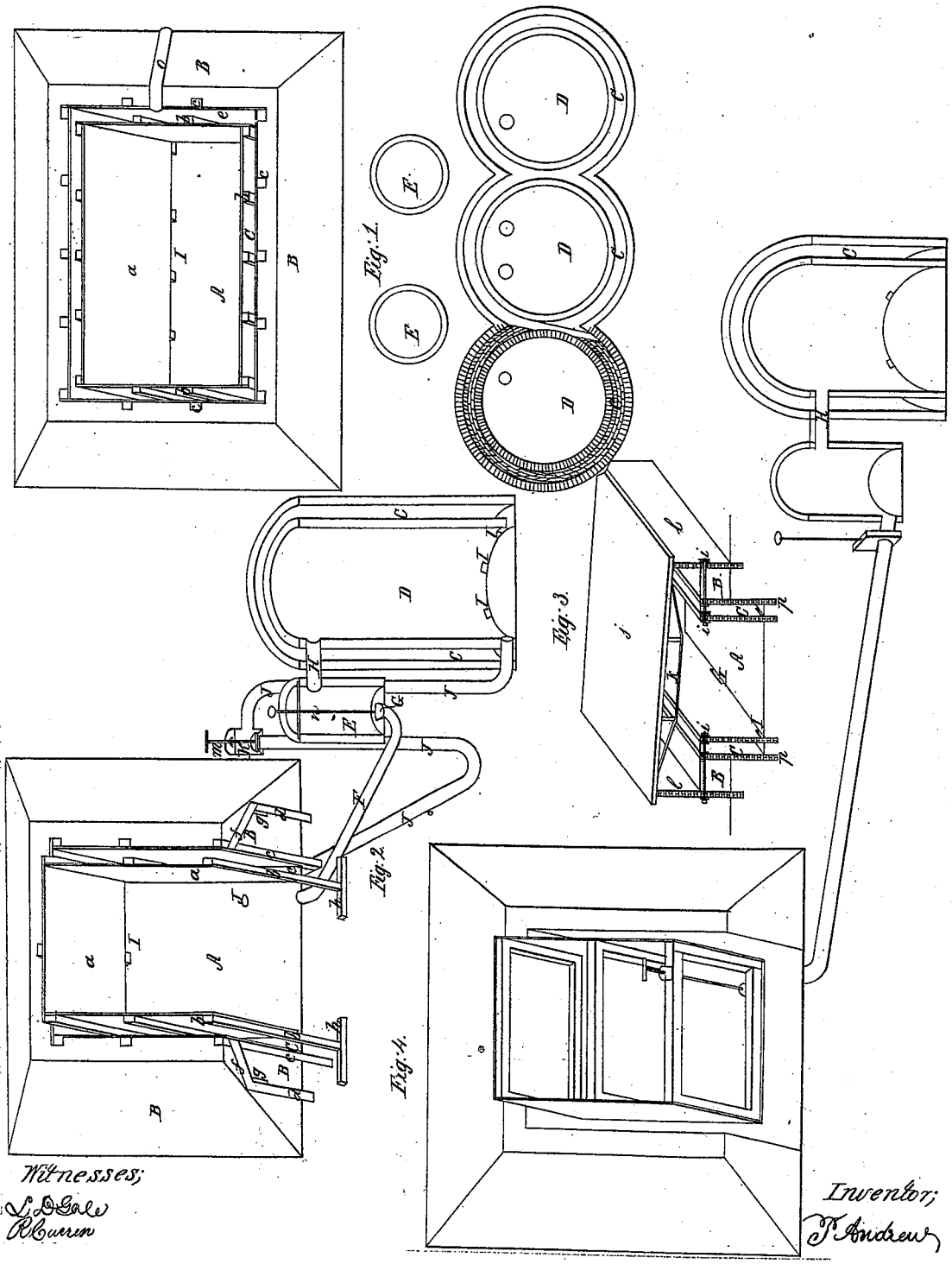

PETER ANDREW, OF CINCINNATI, OHIO.

Letters Patent No. 65,040, dated May 28, 1867.

---

IMPROVEMENT IN TANKS FOR STORAGE OF PETROLEUM.

---

The Schedule referred to in these Letters Patent and making part of the same.

---

TO ALL WHOM IT MAY CONCERN:

Be it known that I, PETER ANDREW, of the city of Cincinnati, in the county of Hamilton, and State of Ohio, have invented certain new and useful Tanks for the Storage and Safe-Keeping of Petroleum Oil; and I hereby declare that the following is a full and sufficient description, reference being had to the annexed drawings, making part of the specification, and letters of reference marked thereon, the same letters being used in all the drawings referring to the same parts. In the drawings which illustrate my improvements—

Figure 1 presents a perspective view of the upper wooden tank A, the lower brick tanks D, and water-cistern E; showing the water-space C, which is the space between the walls of the tank and the wall of the embankment; the embankment B, the posts $b$, and the siding $a$ of the tank; the posts $d$ and the plank $e$ that support the embankment.

Figure 2 is a perspective view of one half of the upper and lower tanks and water-cistern, exhibiting more clearly the manner of their construction and arrangement; showing the discharge pipe F, which conducts the oil and water from the bottom of tank A to the bottom of water-cistern E, the valve G, that closes the discharge end of pipe F; the pipe H, through which the contents of the upper tank A pass into the lower tank D, after rising through the water in water-cistern E. Pipe J, with its valve K is shown; this pipe also conveys the contents of the upper to the lower tank. Water-passages I are openings through the sides of the tank at the bottom, for the passage of the water, to and from the tank, to the water-space in the wooden tanks; they are formed by holding the siding $a$ an inch above the bottom of the tank.

Figure 3 is a perspective view of half of a covered brick tank, showing how it is constructed and arranged, exhibiting the interior of the tank A, the embankment B, water-space C, water-passage I, roof $j$, truss-rods $k$, and the walls that enclose the tank $l$.

A, tank or receptacle for the oil. B, embankment that surrounds the tank. C, space between the walls of the embankment and the tank named water-space. D, circular brick tanks, placed entirely below the surface of the ground; these tanks are held in reserve to receive the oil in case the oil in the upper tanks takes fire. E, water-cistern. At the termination of the emptying of the upper tanks, the water in this cistern cuts off all connection between the oil in pipe F and what has passed into the lower tank. F, pipe for conducting the oil from the bottom of the lower tank to the bottom of the water-cistern. G, valve at the bottom of the water-cistern, closing the end of pipe F preventing the contents of the upper tank passing to the lower one, except when desirable. H, pipe for passage of oil from the water-cistern to the lower tank. I, water-passage openings through the sides of the tanks at the bottom to the water-space for the passage of the water to and from the tank to the water-space. J, pipe that conducts the oil from the bottom of the upper and discharges it into the lower tank at or near the bottom; it is so arranged that it will remain full after the upper tank is emptied, to prevent fire being communicated through it to the lower tank. When the upper tank is emptied water should be let into it, which would enter the pipe and displace the oil. K, valve for closing pipe J, used only when necessary to remove the oil from the upper to the lower tank. $a$, plank siding of the upper tank, spiked to posts $b$; having an open joint between the planks for calking. $b$, posts to which are spiked the siding $a$; these are put into the ground and anchored. $c$, posts that support the embankment, to which are spiked plank $e$. $d$, posts which stand in the embankment, and are covered by it. Cross-piece $f$ extends from the top of these posts to the top of posts $c$. $e$, plank fastened to posts $c$, which, with the aid of posts $c$ and $d$, support the embankment. These plank may be put on either side of the posts; if on the inside, will not be required to be fastened so strongly, as the ground presses them against the posts. $f$, cross-pieces that are fastened to the tops of posts $c$ and $d$ to hold them in position. $g$, planks fastened to the inside of posts $d$, below the cross-piece $f$; they, to a certain extent, balance the pressure of the embankment against the siding $e$. $h$, anchors to posts $b$, to prevent the tanks from floating. $i$, iron rods passing through the walls of the tank and walls of the embankment, for the purpose of keeping the walls in position. $j$, roof of an enclosed tank. $k$, truss-rods for supporting the roof. $l$, outer wall or wall enclosing the tank. $m$, screw for raising valve K. $n$, rod for opening valve G. $o$, gutter crossing the top of the embankment to carry off the surplus water. $p$, inside wall of embankment.

Description.

The tanks may be made of wood, brick, or stone, and may be of any depth and area, and of any form; may be built above or below the surface of the ground. If built of wood, the square form will be the most economical; if constructed of brick or stone, the round may be preferable. Sheet iron may be used as the material for the tank, if desired. The tank A, or oil receptacle, is enclosed by a wall, $p$, or the embankment may be supported by posts $c$ and plank $e$. The space between the tank and wall should be as wide as to admit a person going between them for the purpose of cleaning the bottom of the space C, and making necessary repairs. Openings I are made in the side of the tank at the bottom for the passage of the water to and from the inside of the tank to the water-space C. An embankment is placed against the outer wall $l$ or plank $e$, sufficiently wide to resist the pressure of the tank when full. The level or inclining situation of the ground is to be taken into consideration when constructing the tank, if one or more tanks are to be held in reserve as safety tanks in the event of fire. The ground being sufficiently inclining, an excavation will be made of a depth that will supply the ground necessary to make the embankment of the tanks of the required depth. If the ground is level the upper tanks must be placed entirely above the surface of the ground, and the safety or reserve tanks entirely below the surface, and the earth taken from excavations of the lower ones used for the embankment of the upper. However, for cheapness of construction and convenience, before excavating for the lower tanks, the walls of the upper ones should be built, and the earth as it is taken from the lower placed against the outer wall of the upper ones for an embankment. If wood is used, instead of other material, for tanks A, the posts $b$ will be placed in the ground, and anchored by a cross-piece, $h$, at the bottoms of the posts, and the siding of plank $a$ will be spiked to them, leaving an open joint between the plank for calking. The bottoms and inside of the outer wall should be cemented when the ground will not retain the water. The specific gravity of oil being a little lighter than water it will stand in the tank a little higher than the water in the water-space, consequently the tank will be made a little higher than the embankment. The sides of the tank should be made tight, but it is not necessary that it should be very strong, as the pressure on the sides is always balanced. This balancing of the pressure will prevent leakage, except where the oil in the tank rises above the water in the water-space.

The following is a description of the arrangment of the tanks, and the manner in which they are connected by pipes for the purpose of extinguishing the fire and saving the oil in the event of the oil taking fire. The bottom of the upper tank must be a little above the top of the lower one, that the oil can be entirely drained through pipes F and G into the lower tank. These pipes should be of sufficient capacity to empty the tank in a short time. Pipe F conducts the oil from the bottom of the upper tank A to the bottom of the water-cistern E. It rises through the water to near the top of the cistern, and flows through a pipe, H, into the lower tank. At the bottom of the cistern a valve, G, is placed, covering the end of the pipe F, to prevent the oil passing to the lower tank, except when necessary. When the upper tank is entirely empty the water cuts off all connection between the oil and the pipe and that that is in the lower tank. As more than one pipe will be necessary when the tanks are very large, a pipe, J, arranged in this manner may be used. It descends from the bottom of the upper tank some feet; it then runs horizontally; when within a foot of the lower tank it rises nearly to the surface of the ground, supposing the surface to be on a level with the bottom of the upper tank. Here a valve, K, is placed for closing the pipes, which is only used when it is necessary to transfer the contents of the upper to the lower tank. The pipe again descends and enters the lower tank at the bottom or near it. By this arrangement the pipe is kept full, thus preventing the fire being communicated to the lower tank through the pipe, should the oil in the upper tank be on fire when it was transferred to the lower one. Before putting oil into the tank a quantity of water must be let in that will, when the tank is full, fill the water-space and cover the bottom of the tank above the water-passage I. If it is found at any time that there is not enough water in the tank to keep the oil above the water-passage, it must be put in. No inconvenience at any time will result from too much water being in the tank, as the oil makes room for itself.

In order to explain clearly the operation of the tank, we will suppose it to be full of water to overflowing, that the water is passing over the embankment through gutter $o$. The oil is now put into the tank, and as fast as it enters it displaces a weight of water equal to its own weight, which passes from the tank through the water-passages, and so continues to operate until all the water above the water-passages is driven from the tank and the oil begins to flow through them. The filling of the tank with oil should cease when the oil is within an inch of the water-passages. This is filling the tank from the top downward. The common mode of filling will be to admit the oil after sufficient water has been put into the tank. The oil, as it fills the tank, will force the water through the water-passages I into the water-space G, filling the space with water nearly to the height of the oil in the tank. The difference between the height of the oil in the tank and the water in the water-space is caused by the difference of their weights. If only the necessary quantity of water had been admitted before the oil was let in, the tank will be full when the water begins to flow through the gutter $o$.

The advantages claimed for these tanks are as follows: first, that if used without the reserve tanks, they are safer in event of fire than those now in use, as the fire will be confined within the embankment, consequently not endanger other tanks; second, for extinguishing the fire and saving the oil should the tank take fire; third, cheapness of construction; fourth, convenience, especially at wells pumping a large quantity of water with the oil.

Having described the nature of my inventions, their use and mode of construction, I will proceed to state the claims:

1. I claim the oil-tank, so constructed that the oil will rest on the surface of the water and be surrounded by water on its sides, as set forth, when said tank is arranged and combined for discharging into the lower reservoir in case of a fire, substantially as set forth.

2. I claim, for the purpose of extinguishing fire and saving oil that may be on fire, oil-tanks, situated in relation to each other as described, connected by pipes constructed and arranged in such a manner that the oil from the upper tanks may be conveyed to the lower ones, without danger of fire being communicated through these pipes from the upper to the lower tanks, should the oil be on fire at the time of its being transferred.

3. I claim the construction and arrangement of oil-tanks, and pipes connecting these tanks, as described and specified for purposes set forth.

P. ANDREW.

Witnesses:
L. D. GALE,
C. G. ALLEN.